US00RE44942E

(19) United States
(12) Reissued Patent
Lee et al.

(10) Patent Number: US RE44,942 E
(45) Date of Reissued Patent: Jun. 10, 2014

(54) MOBILE COMMUNICATION DEVICE

(71) Applicant: LG Electronics Inc., Seoul (KR)

(72) Inventors: Sung-Tae Lee, Incheon (KR); Jin-Ho Kim, Yongin-si (KR); Jeong-Hoon Kang, Seoul (KR)

(73) Assignee: LG Electronics Inc., Seoul (KR)

(21) Appl. No.: 13/767,498

(22) Filed: Feb. 14, 2013

Related U.S. Patent Documents

Reissue of:
(64) Patent No.: 8,005,517
Issued: Aug. 23, 2011
Appl. No.: 11/734,164
Filed: Apr. 11, 2007

(30) Foreign Application Priority Data

Oct. 25, 2006 (KR) ..... 10-2006-0104232
Dec. 22, 2006 (KR) ..... 10-2006-0132799

(51) Int. Cl.
*H04M 1/00* (2006.01)
*H04M 1/17* (2006.01)

(52) U.S. Cl.
USPC ..... 455/575.1; 455/569.1; 455/569.2; 455/570; 379/419; 379/420; 379/428; 379/430; 379/437; 381/333; 381/388; 381/338; 381/337; 381/339; 381/345; 381/349; 381/351; 381/335; 381/306; 181/160; 181/175; 181/182; 181/189

(58) Field of Classification Search
CPC ... H04M 1/035; H04R 1/2811; H04R 1/2857; H04R 2499/11
USPC ..... 455/569.1, 569.2, 570; 379/419, 420, 379/428, 430, 437; 381/333, 388, 338, 337, 381/339, 345, 349, 351, 335, 306; 181/160, 181/175, 182, 189
See application file for complete search history.

(56) References Cited

U.S. PATENT DOCUMENTS 5,081,674 A * 1/1992 Wijas et al. ..... 379/433.02
5,150,417 A * 9/1992 Stahl ..... 381/349
5,822,439 A * 10/1998 Sakiyama et al. ..... 381/71.1
6,002,781 A * 12/1999 Takayama et al. ..... 381/338
6,763,110 B1 * 7/2004 Sung ..... 379/433.02

(Continued)

FOREIGN PATENT DOCUMENTS

CN 1476177 A 2/2004
CN 1627773 A 6/2005

(Continued)

*Primary Examiner* — Ping Hsieh
*Assistant Examiner* — Ganiyu A Hanidu
(74) *Attorney, Agent, or Firm* — Birch, Stewart, Kolasch & Birch, LLP

(57) ABSTRACT

A mobile communication device is provided. The mobile communication device includes a terminal body, and a speaker module located in the terminal body. The speaker module includes an enclosure located in the terminal body, the enclosure defining a chamber therein, and a speaker having a front surface and a rear surface, the speaker being located in the enclosure such that the front surface of the speaker is exposed from the enclosure and the rear surface thereof is positioned within the chamber, to allow a sound generated from the rear surface to resonate within the chamber. A mutual interference between the sound generated from the front side of the sound emission part and the sound emitted from the rear side thereof can be reduced to thereby improve the performance of the middle and low sound.

44 Claims, 10 Drawing Sheets

(56) References Cited

U.S. PATENT DOCUMENTS

| | | | | |
|---|---|---|---|---|
| 7,366,314 | B2 * | 4/2008 | Corley et al. | 381/311 |
| 7,369,673 | B2 * | 5/2008 | Matsumoto et al. | 381/386 |
| 2002/0052216 | A1 | 5/2002 | Song | |
| 2002/0057816 | A1 | 5/2002 | Kelly et al. | |
| 2003/0003947 | A1 * | 1/2003 | Yasuda | 455/550 |
| 2004/0170272 | A1 | 9/2004 | Sung | |
| 2004/0240688 | A1 * | 12/2004 | Chiang et al. | 381/306 |
| 2004/0240689 | A1 * | 12/2004 | Miyamoto | 381/306 |
| 2005/0130716 | A1 | 6/2005 | Shin et al. | |
| 2005/0265574 | A1 * | 12/2005 | Holmes et al. | 381/388 |

FOREIGN PATENT DOCUMENTS

| | | | |
|---|---|---|---|
| CN | 1946245 | A | 4/2007 |
| EP | 0 978 978 | A2 | 2/2000 |
| EP | 1 257 147 | A | 11/2002 |
| EP | 1 257 147 | A2 | 11/2002 |
| EP | 1 389032 | A2 | 2/2004 |
| EP | 1476177 | A | 2/2004 |
| EP | 1 670 224 | A1 | 6/2006 |
| EP | 1 773 094 | A2 | 4/2007 |
| EP | 1 883 268 | A2 | 1/2008 |
| JP | 52-141935 | U | 10/1977 |
| JP | 04-336795 | A | 11/1992 |
| JP | 8-213928 | A | 8/1996 |
| JP | 11-17600 | A | 1/1999 |
| JP | 2001-258085 | A | 9/2001 |
| JP | 2005-33723 | A | 2/2005 |
| JP | 2005-167315 | A | 6/2005 |
| JP | 53090 | U1 | 4/2006 |
| JP | 2006-148545 | A | 6/2006 |
| RU | 530480 | A1 | 3/1977 |
| RU | 2-273-966 | C2 | 8/2003 |
| RU | 34053 | U1 | 11/2003 |
| WO | 98/20659 | A1 | 5/1998 |

* cited by examiner

MOBILE COMMUNICATION DEVICE

Matter enclosed in heavy brackets [ ] appears in the original patent but forms no part of this reissue specification; matter printed in italics indicates the additions made by reissue.

*This is a reissue application of U.S. Pat. No. 8,005,517.* This application claims the benefit of Korean Patent Application No. 10-2006-0104232, filed Oct. 25, 2006 and Korean Patent Application No. 10-2006-0132799, filed Dec. 22, 2006, both of which are herein expressly incorporated by reference.

BACKGROUND OF THE INVENTION

1. Field of the Invention

The present invention relates generally to a mobile communication device capable of improving low sound performance and more particularly to a mobile communication device having a speaker module.

2. Description of Related Art

A mobile communication device including a mobile phone or a PDA is one of many mobile electronic devices allowing a user to wirelessly transmit, receive, read, or process information while traveling.

Spurred by the recent advancement of the information technologies, communication technologies, and memory technologies, mobile communication devices can directly create, transmit, or receive multimedia, in addition to their inherent call functions. For example, mobile communication devices can reproduce multimedia files such as music, movies or games, and even have a function of receiving digital multimedia broadcasting (DMB) using satellite or terrestrial television channels. For those mobile communication devices equipped with a digital camera, the devices can also capture images or videos, transmit images or video, or otherwise allow users to enjoy the images or video obtained using the digital cameras.

To help users enjoy the multimedia experience through the mobile communication devices, speakers mounted in the mobile communication devices are moving towards providing high sound performance. Meanwhile, the mobile communication devices are becoming lighter and thinner for user's convenience in carrying them around, which may cause problems as more sophisticated speakers are incorporated into the mobile communication devices. Therefore, there is a need to provide a speaker unit that does not take up unnecessarily excessive space in the mobile communication device but still provides higher sound performance.

The speaker unit of the related art mobile communication device will now be described with reference to FIG. 1. FIG. 1 is a sectional view showing a speaker portion of the related art mobile communication device. As shown in FIG. 1, the mobile communication device 11 includes first and second housings 12 and 13 supporting internal components and forming the exterior thereof, and a speaker unit 16 is fixed at an inner side of the second housing 13.

Through holes 15 are formed on the second housing 13 to allow a sound (A) emitted from a front surface of the speaker unit 16 to pass therethrough, and accordingly, sound waves are discharged to the exterior after passing through the through holes 15.

Ribs 14 are formed on an inner surface of the second housing 13 to fix the speaker unit 16, and the speaker unit 16 is tightly attached to the ribs 14 so that the sound emitted from its front side cannot be leaked to the interior of the mobile communication device.

Gaskets 17 are installed at an inner side of the ribs 14 to ensure the speaker unit 16 to be tightly attached. With such a structure, the speaker unit 16 generates sounds A and B according to signals transmitted from a board 18 provided within the housings 12 and 13. However, one of the problems with the above configuration is that the sound (A) emitting from the front side of the speaker unit 16 is interfered with by the sound (B) generated from the rear surface of the speaker unit 16 and having the opposite phase, thereby degrading the performance of the speaker unit 16. In other words, in case of a low band, because it has strong diffraction, the sound (A) generated from the front side and the sound (B) generated from the rear side having the opposite phase to that of the sound (A) are mixed and cancel each other out.

BRIEF SUMMARY OF THE INVENTION

Therefore, in order to address the above matters the various features described herein have been conceived. One aspect of the exemplary embodiments is to provide a speaker module having good low sound performance and a mobile communication device having the same.

Another aspect of the present invention is to reduce an influence of a speaker unit on a mobile communication device in the aspect that the speaker cannot be an obstacle in making the mobile communication device compact.

According to principles of the present invention, a mobile communication device is provided. The mobile communication device includes a terminal body, and a speaker module located in the terminal body. The speaker module includes an enclosure located in the terminal body, the enclosure defining a chamber therein, and a speaker having a front surface and a rear surface, the speaker being located in the enclosure such that the front surface of the speaker is exposed from the enclosure and the rear surface thereof is positioned within the chamber, to allow a sound generated from the rear surface to resonate within the chamber.

In another aspect, the enclosure may include a front surface having a mounting hole located therein, the mounting hole having a size corresponding to the front surface of the speaker, and the front surface of the speaker may be exposed through the mounting hole.

In a different aspect, the enclosure may have a width corresponding to an interior of the terminal body.

In yet another aspect, the terminal body may include a front housing exposing the front surface of the speaker, a rear housing connected to the front housing by connection protrusions, and the enclosure may include at least one through hole to allow the connection protrusions to pass therethrough.

In still another aspect, the enclosure may include a front case on which the speaker is located, and a rear case attached to the front case to form the chamber.

In yet another aspect, the speaker module may include at least one sound guide connected to the chamber.

According to principles of the present invention, a mobile communication device is provided. The mobile communication device includes a terminal body, and a speaker module located in the terminal body. The speaker module includes an enclosure located in the terminal body, the enclosure forming a chamber for resonating, a speaker having a front surface and a rear surface, the speaker being located in the enclosure such that the front surface is exposed and the rear surface is disposed within the chamber to allow a sound generated from the rear surface to resonate, and a sound guide connected to the enclosure and guiding the sound in the chamber.

In another aspect, the sound guide may have a length sufficient to allow phase of the sound generated from the rear surface of the speaker to be inverted.

In a different aspect, the sound guide may be flexible.

In yet another aspect, the enclosure may include an opening and the sound guide may be inserted in the opening so as to be connected with the chamber.

In still another aspect, the sound guide may include a length control portion that controls the length of the sound guide. The length control portion may include a plurality of extendable creases.

In another aspect, an electric wire connected to the speaker may extend through an interior of the sound guide.

In a further aspect, the speaker module may include at least a second sound guide connected to the enclosure and guiding the sound in the chamber. The terminal body may include a first speaker hole that emits a sound generated from the front surface of the speaker and a second speaker hole that is spaced apart from the first speaker hole and is connected with one of the sound guides to emit a sound.

In yet another aspect, the terminal body may include a front housing exposing the front surface of the speaker, a rear housing connected to the front housing by connection protrusions, and the enclosure may include at least one through hole to allow the connection protrusions to pass therethrough.

According to principles of the present invention, a mobile communication device is provided. The mobile communication device includes a terminal body, a display module located in the terminal body, and a speaker module located adjacent the display module. The speaker module includes an enclosure located in the terminal body, the enclosure forming a chamber, and a speaker having a front surface and a rear surface, the speaker being located in the enclosure such that the front surface of the speaker is exposed from the enclosure and the rear surface thereof is positioned within the chamber to allow a sound from the rear surface thereof to resonate.

In another aspect, a sound guide may be connected to the chamber of the enclosure and guides the sound generated from the rear surface of the speaker. The sound guide may be disposed between the enclosure and the display module. The enclosure may have a configuration that corresponds to that of an upper end portion of the terminal body.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

The mobile communication device according to exemplary embodiments of the present invention will now be described in detail with reference to the accompanying drawings.

Figure 1:
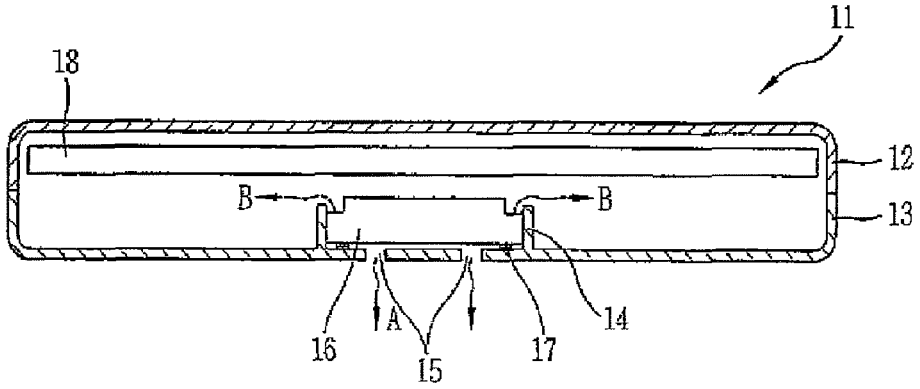
FIG. 1 RELATED ART
FIG. 1 is a sectional view showing a speaker part of a mobile communication device according to the related art.
Figure 2:
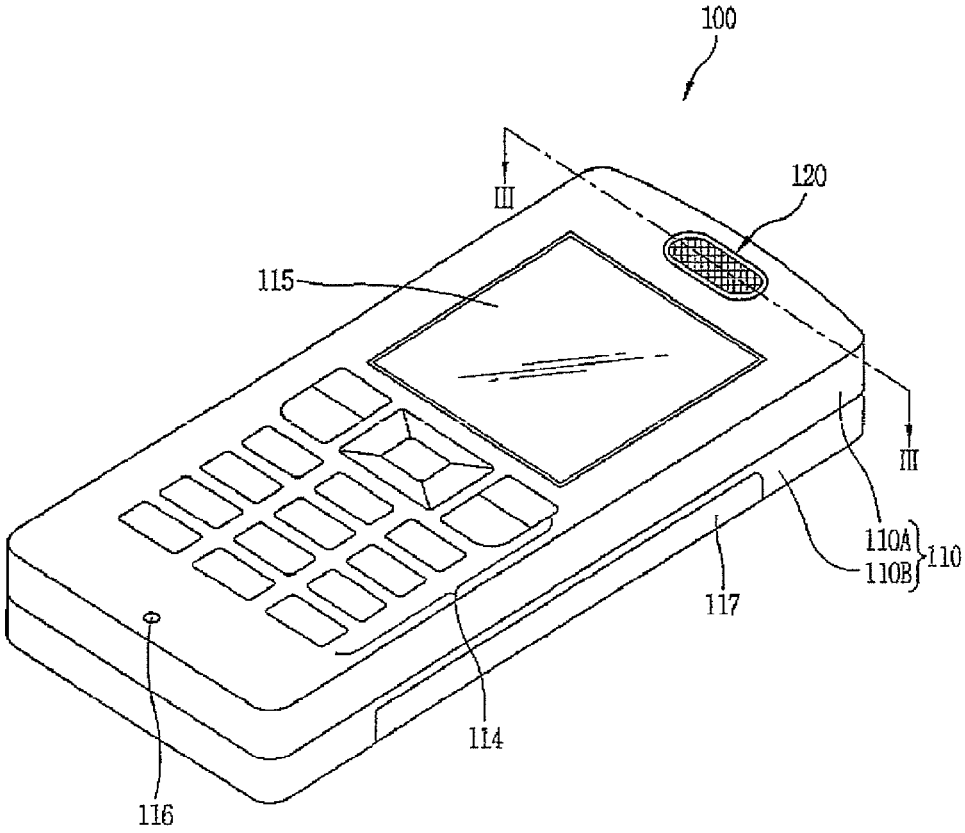
FIG. 2 is a perspective view of a mobile communication device according to a first exemplary embodiment of the present invention.
Figure 3:
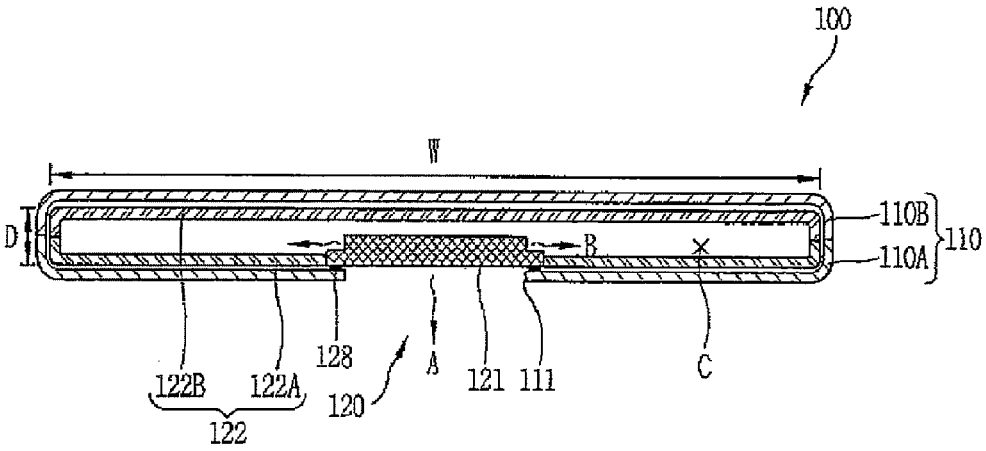
FIG. 3 is a sectional view taken along line III-III in FIG. 2.
Figure 4:
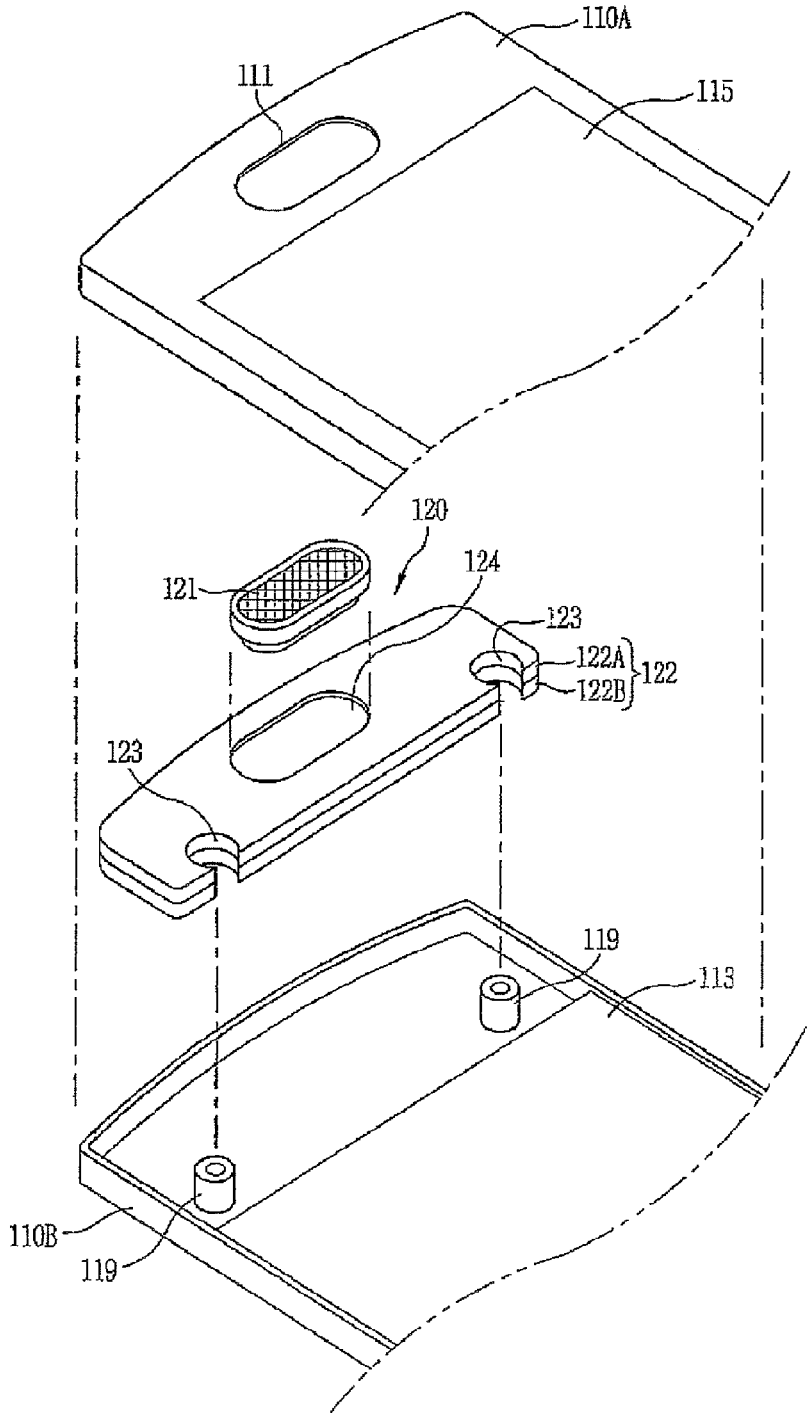
FIG. 4 is an exploded perspective view of the mobile communication device in FIG. 2.

FIG. 2 is a perspective view of a mobile communication device according to a first exemplary embodiment of the present invention, FIG. 3 is a sectional view taken along line III-III in FIG. 2, and FIG. 4 is an exploded perspective view of the mobile communication device in FIG. 2.

With reference to FIG. 2, a mobile communication device 100 includes a terminal body 110 forming the exterior of the mobile communication device 100. The terminal body 110 includes a front housing 110A and a rear housing 110B assembled together.

A keypad 114 including a plurality of input keys is installed to be exposed from a front surface of the front housing 110A, and a window 115 is provided at an upper side of the keypad 114 to allow a user to watch a screen image outputted from a display module 113. A microphone 116 for inputting voice or other sound is provided at a lower end of the front housing 110A, and a battery 117 that supplies power to the mobile communication device 110 is provided at a rear surface of the rear housing 110B.

A speaker module 120 is provided at an upper end portion of the front housing 110A. As shown, the speaker module 120 may also have a function of a receiver or may be implemented as a separate component from the receiver. In addition, while the speaker module is shown at an upper end portion of the front housing 110A adjacent the display module 113, the speaker module may be located at other locations within the terminal body 110.

While the mobile communication device 100 has been shown as a bar type mobile communication device, it is understood that other types of mobile communication devices can incorporate the speaker module 120, such as for example, sliding types, folding types, and combinations thereof.

With reference to FIGS. 3 and 4, a speaker hole or mounting hole 111 is formed on a front surface of the front housing 110A, and a speaker module 120 is tightly attached at an inner side of the speaker hole 111.

The speaker module 120 includes an enclosure 122 fixed within the front housing 110A and having a chamber (C) therein. The speaker module also includes a speaker 121 mounted in the enclosure such that the speaker's front side is exposed and the speaker's rear side is positioned at the interior of the chamber (C) so that a sound (B) generated from the rear side can resonate within the chamber (C).

The enclosure 122 includes amounting hole 124 formed on a front surface thereof and having a size corresponding to the front side of the speaker 121, and the speaker 121 is located in the enclosure 122 such that its front side is exposed through the mounting hole 124.

The enclosure 122 includes a front case 122A that holds the speaker 121 and a rear case 122B attached to the front case 122A to form the chamber (C). The front and rear cases 122A and 122B can be made of a resin material so as to be easily formed, and can be fixed by an adhesive or mutually fused to be combined to hermetically close the internal chamber (C).

The speaker 121 may include a converter (e.g., a combination of a magnet and a coil) and a vibration plate that generate vibration by electricity or can be operated by a piezoelectric method (not shown).

Gaskets 128 are provided on an edge of the front surface of the speaker 121 so that when the enclosure 122 is mounted in the speaker hole 111 of the front housing 110A, sounds within the terminal body 110 cannot be directly leaked out into the terminal body 110. The gaskets 128 can be made of an elastic material such as a double-sided tape.

Accordingly, the sound (A) generated from the front side of the speaker 121 is emitted through the speaker hole 111, while the sound (B) generated from the rear side of the speaker 121 resonates within the chamber (C) to provide a low sound to the exterior of the mobile communication device 100.

With reference to FIGS. 3 and 4, the enclosure 122 has a width corresponding to the width of the interior of the terminal body 110, and thus, volume of the interior of the chamber (C) is increased to facilitate implementation of the low sound by echoing.

Connection protrusions 119 are fixed by a screw on an inner surface of the front and rear housings 110A and 110B, and through holes 123 are formed at both end portions of the enclosure 122 to allow the connection protrusions 119 to pass therethrough. Accordingly, the enclosure 122 can lead to improvement of the performance of the speaker 121 without causing much change in designing the internal structure of the terminal body 110. In other words, the enclosure 122 can be adapted to interiors of mobile communication devices having many different configurations while still providing a sufficiently sized chamber (C).

The enclosure 122 can be formed in a shape conforming to the upper end portion of the terminal body 110. Specifically, by tightly attaching the enclosure 122 to the inner surface of the terminal body 110 while enlarging the size of the chamber (C) for resonance effect, disused space can be minimized within the mobile communication device 100.

The chamber (C) may have a size that can supplement pressure changes at the rear surface of the speaker 121 when the speaker 121 is operated. As shown in FIG. 3, the thickness (D) of the chamber (C) can be smaller than the width (W) and the width (W) substantially corresponds to the horizontal width of the mobile communication device 100, to thus lengthen the capacity of the chamber (C). This arrangement can reinforce the low sound performance by virtue of the lengthened capacity while implementing the slim mobile communication device 100 without affecting the space taken by other components.

Figure 5:
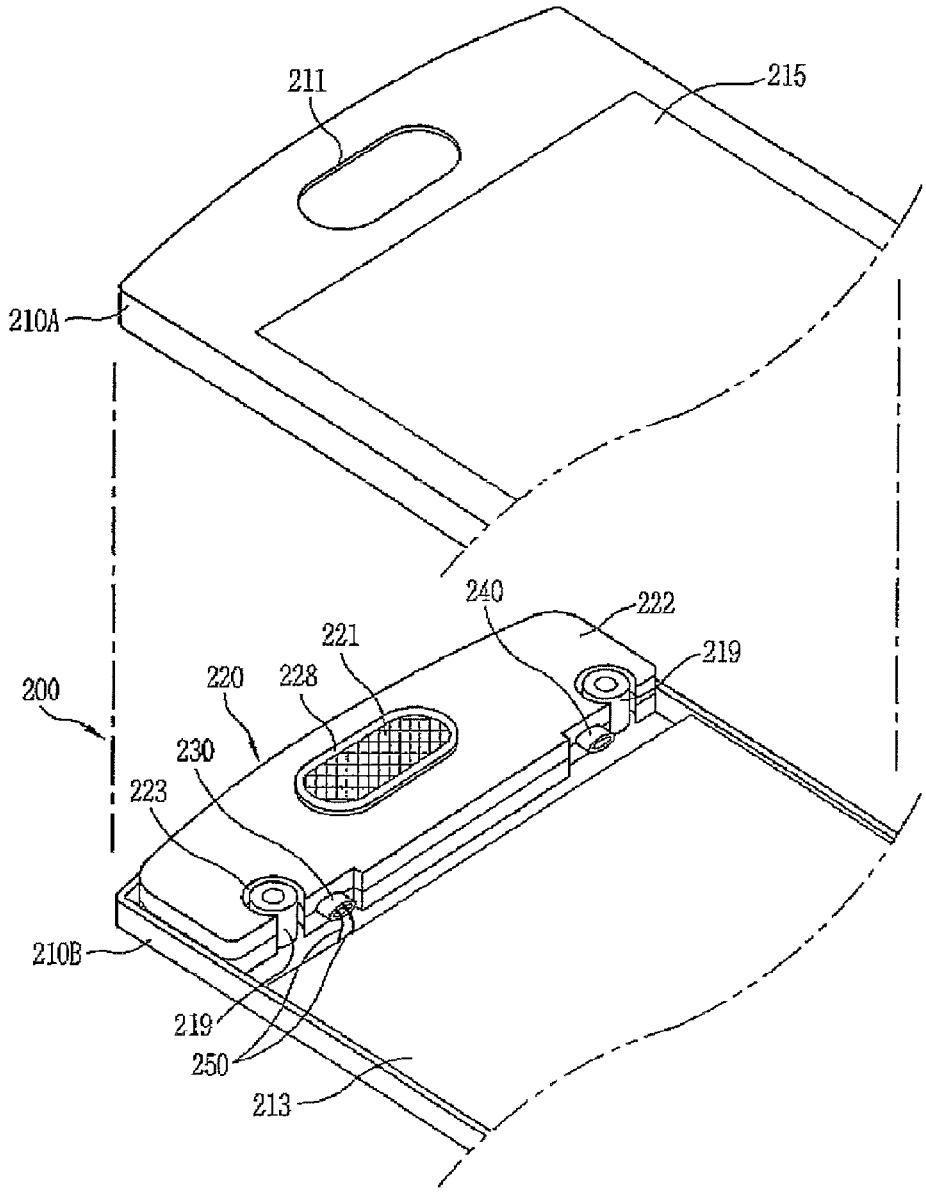
FIG. 5 is an exploded perspective view of a mobile communication device according to a second exemplary embodiment of the present invention.

FIG. 5 is an exploded perspective view of a mobile communication device according to a second exemplary embodiment of the present invention. With reference to FIG. 5, a speaker module 200 includes sound guides 230 and 240, each sound guide 230 and 240 having a certain length and communicating with a chamber (C) of an enclosure 222. The sound guides 230 and 240 guide the sound generated from a rear surface of a speaker 221, and as shown in FIG. 5, the sound resonates within the chamber (C), discharges to the interior of a mobile communication device 200 through the sound guides 230 and 240, and then transfers to the exterior through a front housing 210A or a rear housing 210B. With this structure, a low-band sound can be more abundantly outputted.

There can be multiple units of the sound guides 230 and 240 and they can be disposed to be separated from each other.

As shown in FIG. 5, electric wires 250 connected with the speaker 221 can be wired to pass or extend through the interior of the sound guide 230. Accordingly, no other space for connecting the speaker 221 is needed, thereby facilitating the processing and assembling of the speaker module 200.

In FIG. 5, the sound guides 230 and 240 are disposed between the enclosure 222 and a display module 213. Specifically, the sound guides 230 and 240 are formed with such a length as to be disposed within a space between the enclosure 222, which may be relatively narrow to enlarge the area of the display module 213 as much as possible, and the display module 213.

Other components and members are the same as those in the first exemplary embodiment of the present invention. Equivalent (corresponding) components or members are given the same or similar reference numerals, and a detailed description thereof will be omitted. This is the same for third to sixth exemplary embodiments of the present invention.

Figure 6:
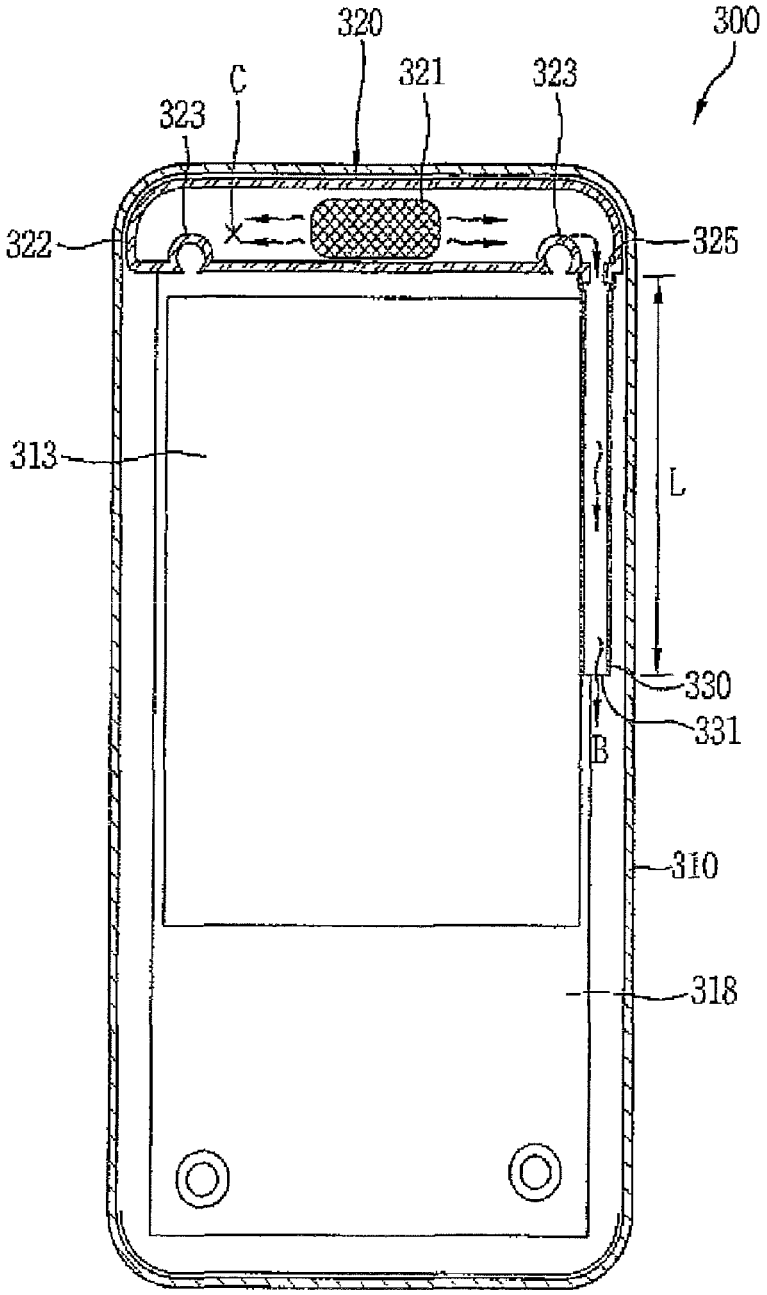
FIG. 6 is a vertical sectional view of a mobile communication device according to a third exemplary embodiment of the present invention.

FIG. 6 is a vertical sectional view of a mobile communication device according to the third exemplary embodiment of the present invention. As shown in FIG. 6, an enclosure 322 is connected with a sound guide 330 extending with a certain length (L) from a chamber (C) to the interior of a mobile communication device 300. The sound guide 330 has an opened end portion to allow a second sound (B) generated from a rear side of a speaker 321 to be guided within the mobile communication device 300 and outputted.

The sound guide 330 can be assembled by being inserted around an opening 325 of the chamber (C). The sound guide 330 can be disposed at edge portions of a display module 313 and the terminal body 310 so as not to affect the interior components of the mobile communication device 300, such as the display module 313.

Because the sound (B) generated from the rear side of the speaker 321 has the opposite phase to that of the sound (A) (refer to FIG. 3) generated from the front side of the speaker 321, the length (L) of the sound guide 330 can be obtained by following equation (1) in order to prevent the sounds from being interfered with each other to cancel each other. The length (L) can be tuned by a different factor:

$$L = \frac{30000 - S}{f_b - V_b} - 0.825 \times \sqrt{S} \tag{1}$$

wherein 'S' is an opening section ($cm^2$) of the sound guide 330 and 0.2 to 0.5 of a valid vibration radius of the speaker 321, $f_b$ is tuning frequency (Hz), $V_b$ is volume (l) of the hermetically closed space of the chamber (C), and the unit of length (L) is cm.

According to equation (1), as the sound to be tuned is turning into a low sound, $f_b$ becomes small while 'L' becomes long. Specifically, in order to improve the low sound, a sufficient length from the rear surface of the speaker 321 should be secured.

Accordingly, a large amount of a high sound band of a sound emitted after being generated from the rear surface of the speaker dies away while a low sound band with strong diffraction is emitted in a phase-inverted state along the sound guide 330 providing an air path, and thus, the amount of cancellation of the low sound can be reduced on the whole and the low sound of the speaker module 320 can be improved.

Table 1 shows data obtained by measuring low sound band improvement effects according to the construction of the present invention. In the corresponding experimentation, the chamber (C) has a volume of 0.4 cc and the sound guide 330 has a length of about 1 cm and an opening section of about 0.06 $cm^2$.

TABLE 1

| | Tuning Frequency (Hz) | | |
|---|---|---|---|
| | 300 | 500 | 700 |
| Sound Pressure without sound guide (dB) | 34.7 | 47.2 | 54.8 |
| Sound Pressure with sound guide (dB) | 38.8 | 53.0 | 59.7 |

According to Table 1, comparing a mobile communication device with the sound guide 330 to a mobile communication device without the sound guide 330, the sound pressure levels at 300 Hz, 500 Hz and 700 Hz were higher by about 4.1 dB, 5.8 dB and 4.9 dB, respectively. This means that the low sound is improved by providing the sound guide 330.

Figure 7:
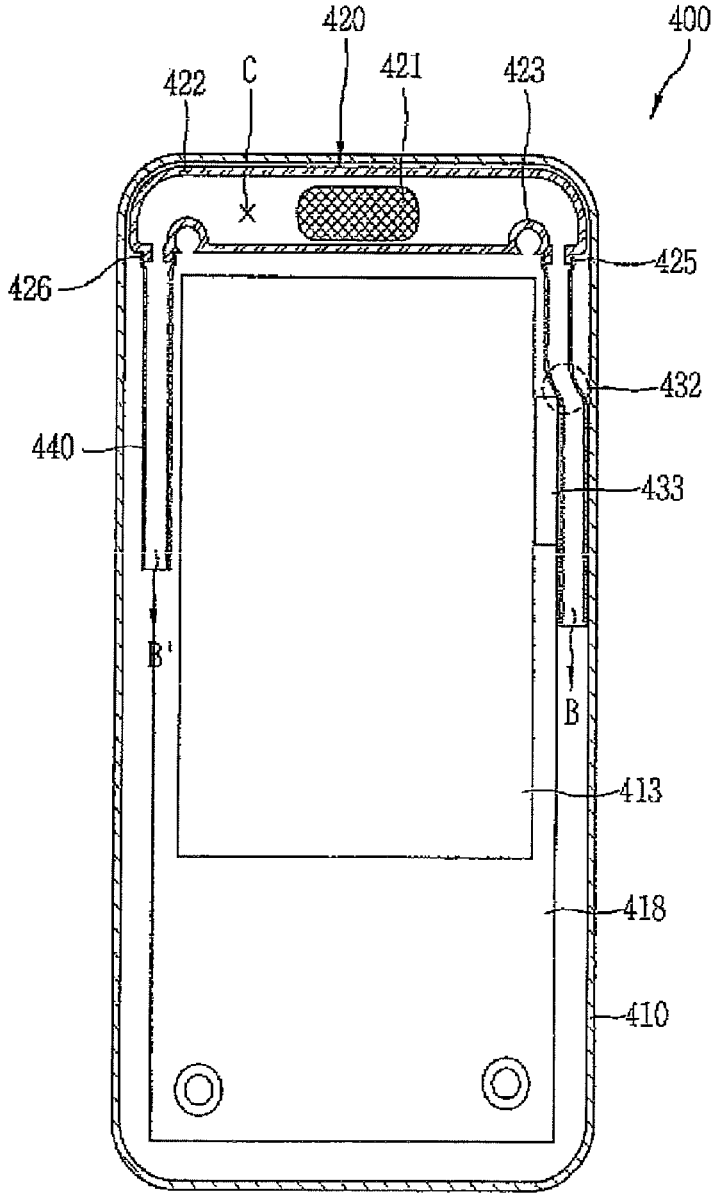
FIG. 7 is a vertical sectional view of a mobile communication device according to a fourth exemplary embodiment of the present invention.

FIG. 7 is a vertical sectional view of a mobile communication device according to a fourth exemplary embodiment of the present invention.

With reference to FIG. 7, an enclosure 422 includes first and second openings 425 and 426 communicating with a chamber (C) and separately disposed from each other. First and second sound guides 430 and 440 are connected with the first and second openings 425 and 426, respectively. The second sounds B and B' are emitted through the first and second sound guides 430 and 440. In this case, the first and second sound guides 430 and 440 have opening sections (S) that can be changeable to allow frequency tuning.

The sound guide 430 is formed to be flexible so it can be disposed to be bent or curved along a remaining space within a mobile communication device 400. Specifically, as shown in FIG. 7, the first sound guide 430 may include a bent portion 432 formed to make a detour to avoid a component 433 of the mobile communication device 400. Thus, despite the sound guides being required to have certain lengths, restrictions in designing and placing components in the mobile communication device 400 can be reduced to diversify the designs and allow for greater flexibility.

Figure 8:
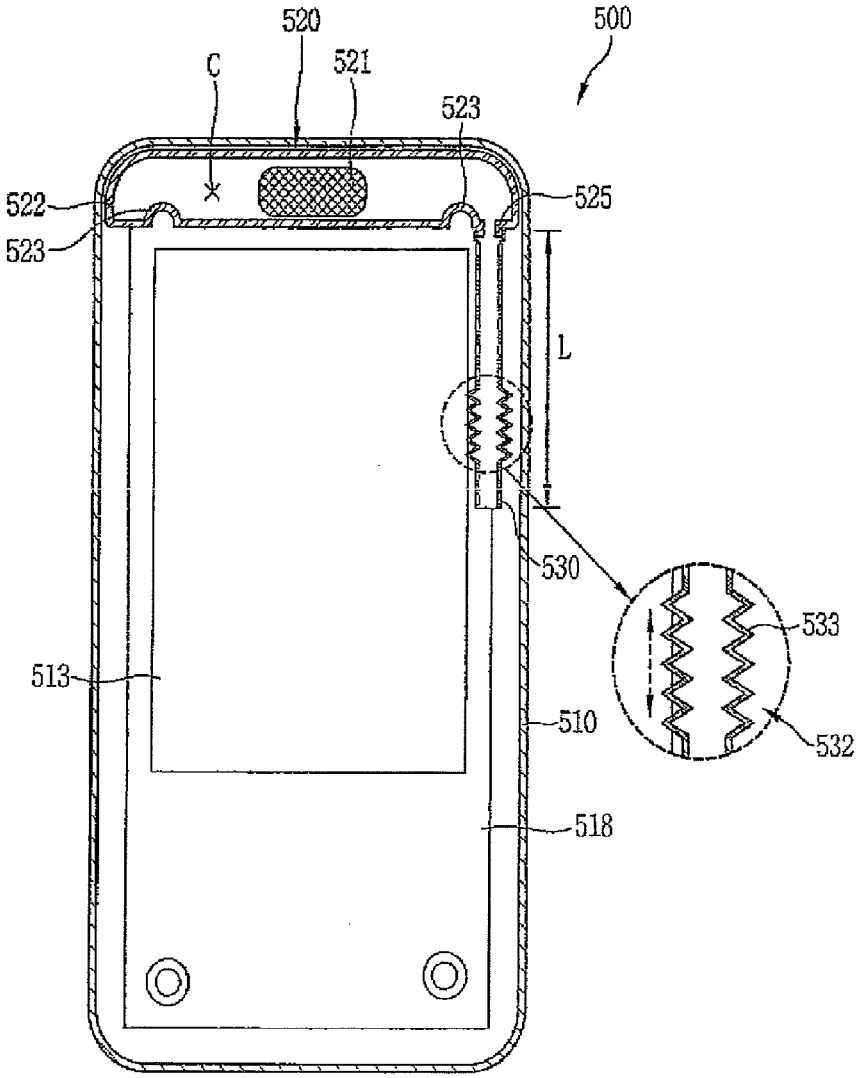
FIG. 8 is a vertical sectional view of a mobile communication device according to a fifth exemplary embodiment of the present invention.

FIG. 8 is a vertical sectional view of a mobile communication device according to a fifth exemplary embodiment of the present invention. As shown in FIG. 8, a sound guide 530 includes a length control portion 532 that may control its length (L). Because the length of the sound guide 530 can be directly controlled, fine-tuning can be accomplished.

The length control portion 532 will now be described in detail. The length control portion 532 includes a crease portion 533 at a certain portion of the sound guide 530, the crease portion 533 having a plurality of creases that are elastically extensible. Thus, without causing a change in a sectional area of the sound guide 530, the crease portion 533 can be folded or smoothed out to control the overall length (L) of the sound guide 530.

Figure 9:
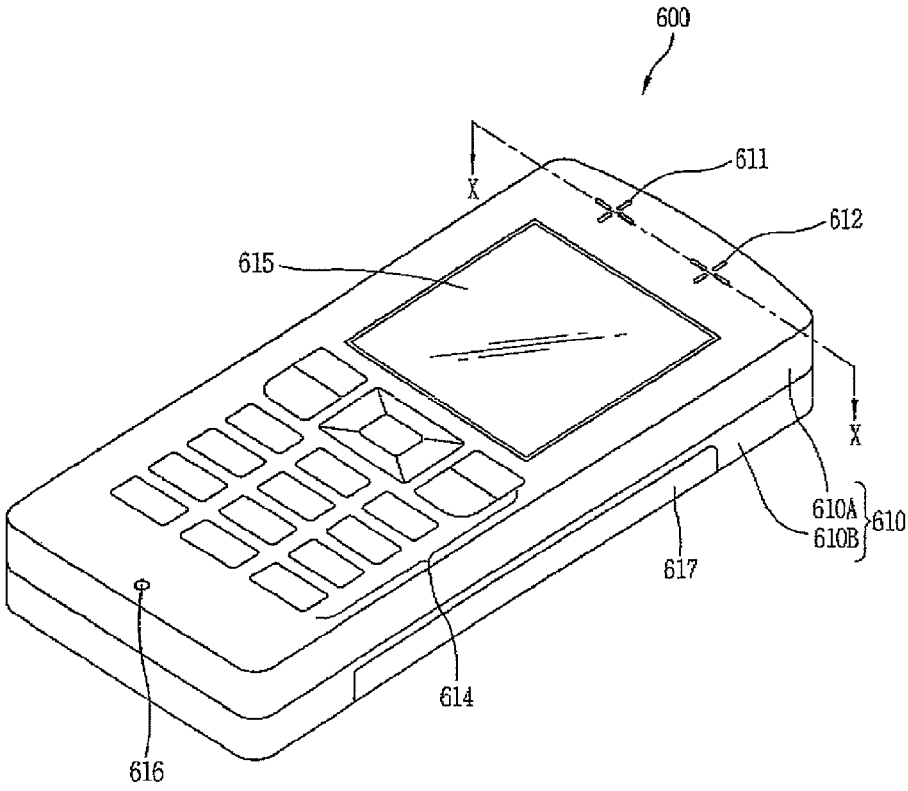
FIG. 9 is a vertical sectional view of a mobile communication device according to a sixth exemplary embodiment of the present invention.
Figure 10:
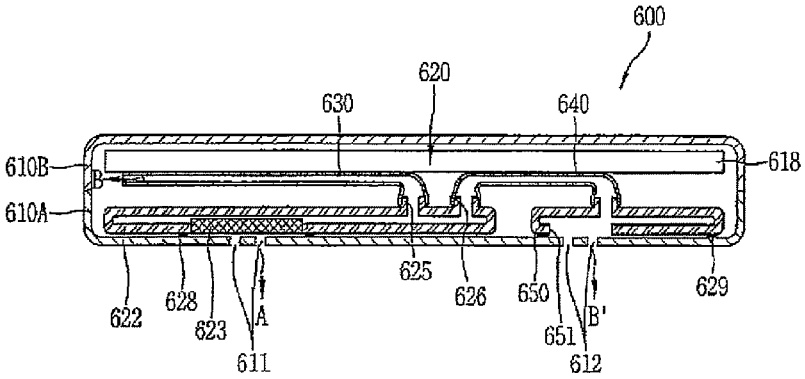
FIG. 10 is a sectional view of the mobile communication device taken along line X-X in FIG. 9.

FIG. 9 is a vertical sectional view of a mobile communication device according to a sixth exemplary embodiment of the present invention, and FIG. 10 is a vertical sectional view of the mobile communication device in FIG. 9, taken along line X-X.

With reference to FIG. 9, on a front surface of a front housing 610A, there are formed a first speaker hole 611 and a second speaker hole 612 spaced apart from the first speaker hole 611.

With reference to FIG. 10, a first enclosure 622 with a speaker 623 mounted therein is provided at an inner side of the first speaker hole 611, and a hollow second enclosure 650 is provided at an inner side of the second speaker hole 612.

The first enclosure 622 is connected with first and second sound guides 630 and 640. The first sound guide 630 forms an open duct with a certain length at an inner space of the front housing 610A and the rear housing 610B, constituting a main chamber, and the second sound guide 640 constitutes a sub-chamber connected with the second enclosure 650 to directly emit the second sound B' to the exterior, thereby implementing more direct low sound strengthening effects.

As so far described, the speaker module according to the present invention is constructed to reduce the mutual interference between the sound generated from the front side of the speaker and the sound emitted from the rear side thereof, thereby improving the performance of the middle and low sound. In addition, because the enclosure has the sound guides, the performance of the low sound can be more enhanced. Moreover, because the enclosures can be formed in various shapes, their mounting characteristics and space utilization in the mobile communication device can be enhanced to make the mobile communication device thinner.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed:

1. A mobile communication device comprising:

a terminal body; and a speaker module located in the terminal body, the speaker module including:

an enclosure located in the terminal body, the enclosure forming a chamber for resonating;

a speaker having a front surface and a rear surface, the speaker being located in the enclosure such that the front surface is exposed to a speaker hole formed on a surface of the terminal body and the rear surface is disposed within the chamber to allow a first sound generated from the front surface of the speaker to be emitted through the speaker hole and a second sound generated from the rear surface to resonate within the chamber; and a sound guide connected to the enclosure with a certain length and guiding the sound resonated in the chamber, wherein the sound guide has an end portion opened within the terminal body such that the second sound resonated within the chamber is discharged to an interior of the terminal [body separate] *body, the interior separated* from the chamber.

2. The device of claim 1, wherein the sound guide has a length sufficient to allow phase of the sound generated from the rear surface of the speaker to be inverted.

3. The device of claim 1, wherein the sound guide is flexible.

4. The device of claim 1, wherein the enclosure includes an opening and the sound guide is inserted in the opening so as to be connected with the chamber.

5. The device of claim 1, wherein the sound guide includes a length control portion that controls the length of the sound guide.

6. The device of claim 5, wherein the length control portion includes a plurality of extendable creases.

7. The device of claim 1, wherein an electric wire connected to the speaker extends through an interior of the sound guide.

8. The device of claim 1, wherein the speaker module includes at least a second sound guide connected to the enclosure and guiding the sound in the chamber.

9. The device of claim 1, wherein the terminal body includes a front housing exposing the front surface of the speaker, a rear housing connected to the front housing by connection protrusions, and the enclosure includes at least one through hole to allow the connection protrusions to pass therethrough.

10. A mobile communication device comprising:

a terminal body;

a display module located in the terminal body; and a speaker module located adjacent the display module, the speaker module including:

an enclosure located in the terminal body, the enclosure forming a chamber;

a speaker having a front surface and a rear surface, the speaker being located in the enclosure such that the front surface of the speaker is exposed to a speaker hole formed on a surface of the terminal body and the rear surface thereof is disposed within the chamber to allow a first sound generated from the front surface of the speaker to be emitted through the speaker hole and a second sound generated from the rear surface to resonate within the chamber; and a sound guide connected to the enclosure with a certain length and guiding the sound resonated in the chamber, wherein the sound guide has an end portion opened within the terminal body such that the second sound resonated within the chamber discharges to an interior of the terminal [body separate] *body, the interior separated* from the chamber.

11. The device of claim 10, wherein the sound guide is disposed between the enclosure and the display module.

12. The device of claim 10, wherein the enclosure has a configuration that corresponds to that of an upper end portion of the terminal body.

*13. A mobile communication device comprising:*

*a terminal body; and*

*a speaker module located in the terminal body, the speaker module including:*

*an enclosure located in the terminal body, the enclosure forming a chamber for resonating;*

*a speaker having a front surface and a rear surface, the speaker being located in the enclosure such that the front surface is exposed from the enclosure and the rear surface is disposed within the chamber to allow a first sound generated from the front surface of the speaker to be emitted through a speaker hole formed on a surface of the terminal body and a second sound generated from the rear surface of the speaker to resonate within the chamber; and*

*a sound guide connected to the enclosure with a certain length and guiding the second sound resonated within the chamber,*

*wherein the sound guide extends along a longitudinal direction of the terminal body and has an opening spaced from the enclosure within the terminal body such that the second sound resonated within the chamber is discharged to an interior of the terminal body, the interior separated from the chamber.*

*14. The device of claim 13, wherein the certain length is sufficient to allow phase of the second sound generated from the rear surface of the speaker to be inverted.*

*15. The device of claim 13, wherein the sound guide is extendable along a longitudinal direction of the terminal body such that a frequency of the second sound generated from the rear surface of the speaker is lowered when the length of the sound guide is increased.*

*16. The device of claim 13, wherein the certain length is calculated by the following equation:*

$$L = \frac{30000 - S}{f_b - V_b} - 0.825 \times \sqrt{S}$$

*where 'L' is the certain length measured in centimeters, 'S' is an opening section of the sound guide measured in $cm^2$, '$f_b$' is a tuning frequency (Hz), and '$V_b$' is a volume of the chamber measured in liters.*

*17. The device of claim 13, wherein an electric wire connected to the speaker extends through an interior of the sound guide.*

*18. The device of claim 13, wherein the sound guide comprises one and another sound guides separately disposed from each other.*

*19. The device of claim 18, further comprising a display module disposed in the terminal body,*

*wherein the one sound guide extends along one side of the display module, and the another sound guide extends along another side of the display module.*

*20. A mobile communication device comprising:*

*a terminal body; and*

*a speaker module located in the terminal body, the speaker module including:*

*an enclosure located in the terminal body, the enclosure forming a chamber for resonating;*

*a speaker having a front surface and a rear surface, the speaker being located in the enclosure such that the front surface is exposed from the enclosure and the rear surface is disposed within the chamber to allow a first sound generated from the front surface of the speaker to be emitted through a speaker hole formed on a surface of the terminal body and a second sound generated from the rear surface of the speaker to resonate within the chamber; and*

*a sound guide connected to the enclosure with a certain length and guiding the second sound resonated within the chamber,*

*wherein the sound guide has an opening formed within the terminal body such that the second sound resonated within the chamber is discharged to an interior of the terminal body, the interior separated from the chamber.*

*21. A mobile communication device comprising:*

*a terminal body;*

*a display module disposed in the terminal body; and*

*a speaker module located adjacent the display module, the speaker module including:*

*an enclosure located adjacent a first end of the terminal body, the enclosure forming a chamber;*

*a speaker having a front surface and a rear surface, the speaker being located in the enclosure such that the front surface of the speaker faces a speaker hole formed on a surface of the terminal body and the rear surface is disposed within the chamber to allow a first sound generated from the front surface to be emitted through the speaker hole and a second sound generated from the rear surface to resonate within the chamber; and*

*a sound guide connected to the enclosure with a certain length and guiding the second sound resonating within the chamber,*

*wherein the sound guide extends along an edge of the display module towards a second end of the terminal body opposite the first end, the sound guide having an opening spaced from the enclosure within the terminal body such that the second sound resonated within the chamber is discharged to an interior of the terminal body, the interior separated from the chamber.*

*22. A mobile communication device comprising:*

*a terminal body; and*

*a speaker module located in the terminal body, the speaker module including:*

*an enclosure located in the terminal body, the enclosure forming a chamber for resonating;*

*a speaker having a front surface and a rear surface, the speaker being located in the enclosure such that the front surface faces a speaker hole formed on a surface of the terminal body and the rear surface is disposed within the chamber to allow a first sound generated from the front surface of the speaker to be emitted through the speaker hole and a second sound generated from the rear surface to resonate within the chamber; and*

*a sound guide connected to the enclosure, the sound guide providing an air path for guiding the second sound to an interior of the terminal body, the sound guide having an opening spaced from the enclosure by a certain length such that the second sound is emitted in a phase-inverted state through the air path.*

*23. The device of claim 20, wherein the certain length is sufficient to allow phase of the second sound generated from the rear surface of the speaker to be inverted.*

*24. The device of claim 20, wherein the sound guide is extendable along a longitudinal direction of the terminal body such that a frequency of the second sound generated from the rear surface of the speaker is lowered when the length of the sound guide is increased.*

*25. The device of claim 20, wherein the certain length is calculated by the following equation:*

$$L = \frac{30000 - S}{f_b - V_b} - 0.825 \times \sqrt{S}$$

*where 'L' is the certain length measured in centimeters, 'S' is an opening section of the sound guide measured in $cm^2$, 'fb' is a tuning frequency (Hz), and 'Vb' is a volume of the chamber measured in liters.*

*26. The device of claim 20, wherein an electric wire connected to the speaker extends through an interior of the sound guide.*

*27. The device of claim 20, wherein the sound guide comprises one and another sound guides separately disposed from each other.*

*28. The device of claim 27, further comprising a display module disposed in the terminal body,*

*wherein the one sound guide extends along one side of the display module, and the another sound guide extends along another side of the display module.*

*29. The device of claim 28, wherein the terminal body comprises a front housing and a rear housing which are attached to each other, and*

*wherein a window is provided in the front housing through which a screen image of the display module is viewable.*

*30. The device of claim 21, wherein the certain length is sufficient to allow phase of the second sound generated from the rear surface of the speaker to be inverted.*

*31. The device of claim 21, wherein the sound guide is extendable along a longitudinal direction of the terminal body such that a frequency of the second sound generated from the rear surface of the speaker is lowered when the length of the sound guide is increased.*

*32. The device of claim 21, wherein the certain length is calculated by the following equation:*

$$L = \frac{30000 - S}{f_b - V_b} - 0.825 \times \sqrt{S}$$

*where 'L' is the certain length measured in centimeters, 'S' is an opening section of the sound guide measured in $cm^2$, 'fb' is a tuning frequency (Hz), and 'Vb' is a volume of the chamber measured in liters.*

*33. The device of claim 21, wherein an electric wire connected to the speaker extends through an interior of the sound guide.*

*34. The device of claim 21, wherein the sound guide comprises one and another sound guides separately disposed from each other.*

*35. The device of claim 34, wherein the one sound guide extends along one side of the display module, and the another sound guide extends along another side of the display module.*

*36. The device of claim 21, wherein the terminal body comprises a front housing and a rear housing which are attached to each other, and*

*wherein a window is provided in the front housing through which a screen image of the display module is viewable.*

*37. The device of claim 21, wherein the terminal body has two shorter lateral sides, and two longer lateral sides which interconnect the shorter sides in a rectangular fashion,*

*wherein the enclosure is disposed between the display module and one of the shorter lateral sides of the terminal body, and*

*wherein the sound guide extends along an edge of the display module between the display module and one of the longer lateral sides of the terminal body.*

*38. The device of claim 22, wherein the certain length is sufficient to allow phase of the second sound generated from the rear surface of the speaker to be inverted.*

*39. The device of claim 22, wherein the sound guide is extendable along a longitudinal direction of the terminal body such that a frequency of the second sound generated from the rear surface of the speaker is lowered when the length of the sound guide is increased.*

*40. The device of claim 22, wherein the certain length is calculated by the following equation:*

$$L = \frac{30000 - S}{f_b - V_b} - 0.825 \times \sqrt{S}$$

*where 'L' is the certain length measured in centimeters, 'S' is an opening section of the sound guide measured in cm$^2$, 'fb' is a tuning frequency (Hz), and 'Vb' is a volume of the chamber measured in liters.*

*41. The device of claim 22, wherein an electric wire connected to the speaker extends through an interior of the sound guide.*

*42. The device of claim 22, wherein the sound guide comprises one and another sound guides separately disposed from each other.*

*43. The device of claim 42, further comprising a display module disposed in the terminal body,*

*wherein the one sound guide extends along one side of the display module, and the another sound guide extends along another side of the display module.*

*44. The device of claim 43, wherein the terminal body comprises a front housing and a rear housing which are attached to each other, and*

*wherein a window is provided in the front housing through which a screen image of the display module is viewable.*

* * * * *